US012625590B2

(12) United States Patent
Jang et al.

(10) Patent No.: US 12,625,590 B2
(45) Date of Patent: May 12, 2026

(54) ELECTRONIC DEVICE FOR PROVIDING CONTENT PREVIEW, OPERATION METHOD THEREFOR, AND STORAGE MEDIUM

(71) Applicant: Samsung Electronics Co., Ltd., Suwon-si (KR)

(72) Inventors: Inra Jang, Suwon-si (KR); Kihyoung Son, Suwon-si (KR); Junghwa Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 18/472,762

(22) Filed: Sep. 22, 2023

(65) Prior Publication Data

US 2024/0012529 A1     Jan. 11, 2024

Related U.S. Application Data

(63) Continuation of application No. PCT/KR2022/001934, filed on Feb. 8, 2022.

(30) Foreign Application Priority Data

Mar. 23, 2021     (KR) ........................ 10-2021-0037251

(51) Int. Cl.
*G06F 3/0481* (2022.01)
*G06F 3/0488* (2022.01)
(52) U.S. Cl.
CPC .......... *G06F 3/0481* (2013.01); *G06F 3/0488* (2013.01)
(58) Field of Classification Search
CPC ...... G06F 3/0481; G06F 3/0482; G06F 3/048; G06F 3/0488
See application file for complete search history.

(56) References Cited

U.S. PATENT DOCUMENTS 9,326,035  B1     4/2016  Thompson et al.
2010/0011394  A1     1/2010  Lee et al.
(Continued)

FOREIGN PATENT DOCUMENTS

KR     20110054419 A     5/2011
KR     20120080922 A     7/2012
(Continued)

OTHER PUBLICATIONS

Feng Tian et al., Design and Implementation of VR Video Content Preview and Monitoring System, Jul. 1, 2018, International Conference on Audio—Language and Image Processing, pp. 278-282 (Year: 2018).*
David Cymbalak et al., Mechanism for Video Streaming Control Related to Tracked Speaker Position, Jun. 1, 2013, IEEE International Conference on Intelligent Engineering Systems, pp. 1-6 (Year: 2013).*

(Continued)

*Primary Examiner* — Tam T Tran

(74) *Attorney, Agent, or Firm* — NIXON & VANDERHYE P.C.

(57) ABSTRACT

According to various embodiments, an electronic device comprises: a display, and at least one processor operatively connected to the display, and memory, the memory storing instructions configured to, when executed, cause to the electronic device to: display, on the display, objects that respectively represent a plurality of applications; acquire, in response to a first input for a first object among the objects, data related to the playback of realtime content related to an application corresponding to the first object; and provide, based on the acquired data, a preview for the realtime content via an area related to the first object.

15 Claims, 14 Drawing Sheets

(56)         References Cited

U.S. PATENT DOCUMENTS

| | | |
|---|---|---|
| 2010/0329642 A1 | 12/2010 | Kam et al. |
| 2011/0119627 A1 | 5/2011 | Cho et al. |
| 2012/0179969 A1 | 7/2012 | Lee et al. |
| 2013/0268875 A1 | 10/2013 | Han et al. |
| 2013/0326583 A1* | 12/2013 | Freihold ............. G06F 3/04883 726/3 |
| 2015/0074525 A1 | 3/2015 | Costenaro et al. |
| 2015/0212692 A1* | 7/2015 | Hyun .................... G06F 3/0488 715/719 |
| 2016/0092071 A1* | 3/2016 | Lawson ................ G06F 3/0482 345/156 |
| 2017/0142460 A1* | 5/2017 | Yang .................. H04N 21/4627 |
| 2017/0188089 A1 | 6/2017 | Rasool et al. |
| 2017/0329472 A1 | 11/2017 | Kim et al. |
| 2019/0045272 A1 | 2/2019 | Fishman et al. |
| 2020/0301567 A1 | 9/2020 | Park et al. |
| 2020/0304863 A1 | 9/2020 | Domm et al. |
| 2021/0014570 A1 | 1/2021 | Weng |

FOREIGN PATENT DOCUMENTS

| | | |
|---|---|---|
| KR | 20130113978 A | 10/2013 |
| KR | 20130125100 A | 11/2013 |
| KR | 20150089813 A | 8/2015 |
| KR | 101634431 B1 | 6/2016 |
| KR | 20200077939 A | 7/2020 |

OTHER PUBLICATIONS

Extended European Search Report dated Jul. 26, 2024 issued in European Patent Application No. 22775897.6.
International Search Report for PCT/KR2022/001934 mailed May 3, 2022, 4 pages.
Written Opinion of the ISA for PCT/KR2022/001934 mailed May 3, 2022, 4 pages.
Korean Patent Office dated Sep. 26, 2025 for Korean Patent application 10-2021-0037251 with English language translation.

* cited by examiner

200

101

203

205

209

Second server

208

First server

Electronic device

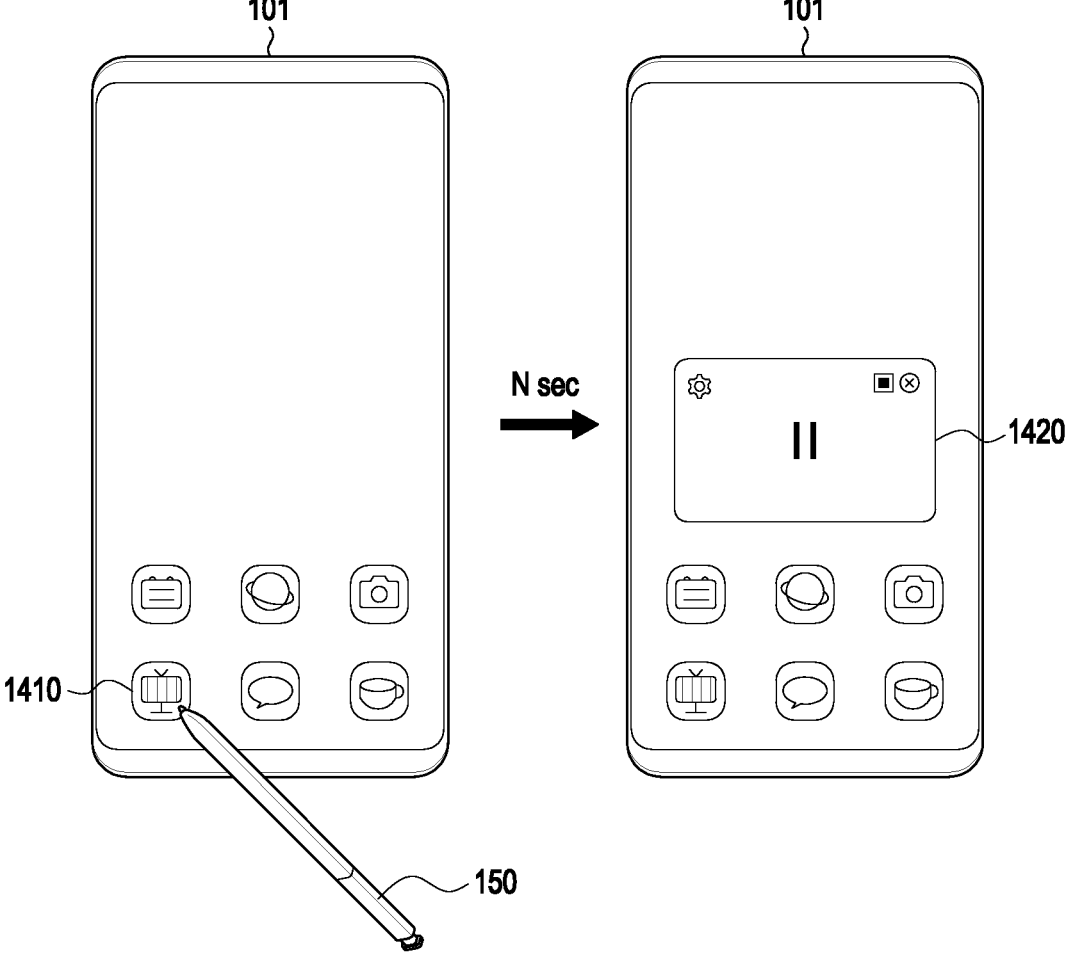
FIG. 14A     FIG. 14B

ELECTRONIC DEVICE FOR PROVIDING CONTENT PREVIEW, OPERATION METHOD THEREFOR, AND STORAGE MEDIUM

CROSS-REFERENCE TO RELATED APPLICATIONS

This application is a continuation of International Application No, PCT/KR2022/001934 designating the United States, filed on Feb. 8, 2022, in the Korean Intellectual Property Receiving Office and claiming priority to Korean Patent Application No. 10-2021-0037251 filed on Mar. 23, 2021, in the Korean Intellectual Property Office, the disclosures of each of which are incorporated by reference herein in their entireties.

BACKGROUND

Field

The disclosure relates to an electronic device for providing a content preview and an operation method and storage medium thereof.

Description of Related Art

Along with the successful commercialization of content recommendation in various fields such as news, education, history, and entertainment, the scale of the content service business is also expanding. As the perception of content services has changed, users are willing to pay to watch (or subscribe to) them. The key to the success of content service providers is to keep users connected to the service for as long as possible and viewing as much content as possible through recommended content.

As a result, the types of content available on electronic devices are diversifying. For example, users may access not only web content, but also Internet-based video services such as over the top (OTT) services, in which various contents such as dramas and movies are provided over the Internet.

As described above, as the types of content available through an electronic device become more diverse, a user may have difficulty selecting desired content from among a multitude of contents. For example, applications related to content execution may be stored in the electronic device, and a shortcut key for executing each of the applications may be displayed in the form of an icon on a touch screen of the electronic device. Accordingly, the user may execute an application on the electronic device by touching one of the icons displayed on the touch screen, to view desired content.

However, as the number of applications capable of playing various types of content increases, it may be inconvenient for the user to execute each application to find desired content. In addition, although the electronic device provides a preview function, it only provides the preview function in a gallery folder including photos or videos. Therefore, there may be a need for a method of attracting more user interest to content-related applications, while increasing the likelihood of user selection.

SUMMARY

Embodiments of the disclosure may provide an electronic device for providing a content preview prior to application execution, and an operation method and storage medium thereof.

According to various example embodiments, an electronic device includes: a display, at least one processor operatively connected to the display, and memory. The memory storing instructions configured to, when executed, cause to the electronic device to: control the display to display objects representing a plurality of applications, respectively, obtain data related to play of real-time content related to an application corresponding to a first object in response to a first input for the first object among the objects, and provide a preview of the real-time content in an area related to the first object, based on the obtained data.

According to various example embodiments, a method of providing a content preview in an electronic device includes: displaying objects representing a plurality of applications, respectively, obtaining data related to play of real-time content related to an application corresponding to a first object in response to a first input for the first object among the objects, and providing a preview of the real-time content in an area related to the first object, based on the obtained data.

According to various example embodiments, a non-transitory computer-readable storage medium stores instructions which, when executed by at least one processor, cause the at least one processor to control an electronic device to perform at least one operation. The at least one operation includes: displaying objects representing a plurality of applications, respectively, obtaining data related to play of real-time content related to an application corresponding to a first object in response to a first input for the first object among the objects, and providing a preview of the real-time content in an area related to the first object, based on the obtained data.

According to various example embodiments, it is possible to attract more user interest to content-related applications in an electronic device, while increasing the likelihood of user selection.

According to various example embodiments, interest may be attracted to content without executing an application by providing content to be played in real time in the form of a preview through an application icon according to a user setting.

According to various example embodiments, as a preview is provided through an application icon, a user may efficiently use a content-related application.

The effects achievable from the disclosure are not limited to those mentioned above, and other effects will be apparent to those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 14A and 14B are diagrams illustrating an example method of providing a content preview through a pop-up window in response to a hovering input according to various embodiments.

With regard to the description of the drawings, the same or similar components may be used for the same or similar reference numerals.

DETAILED DESCRIPTION

Figure 1:
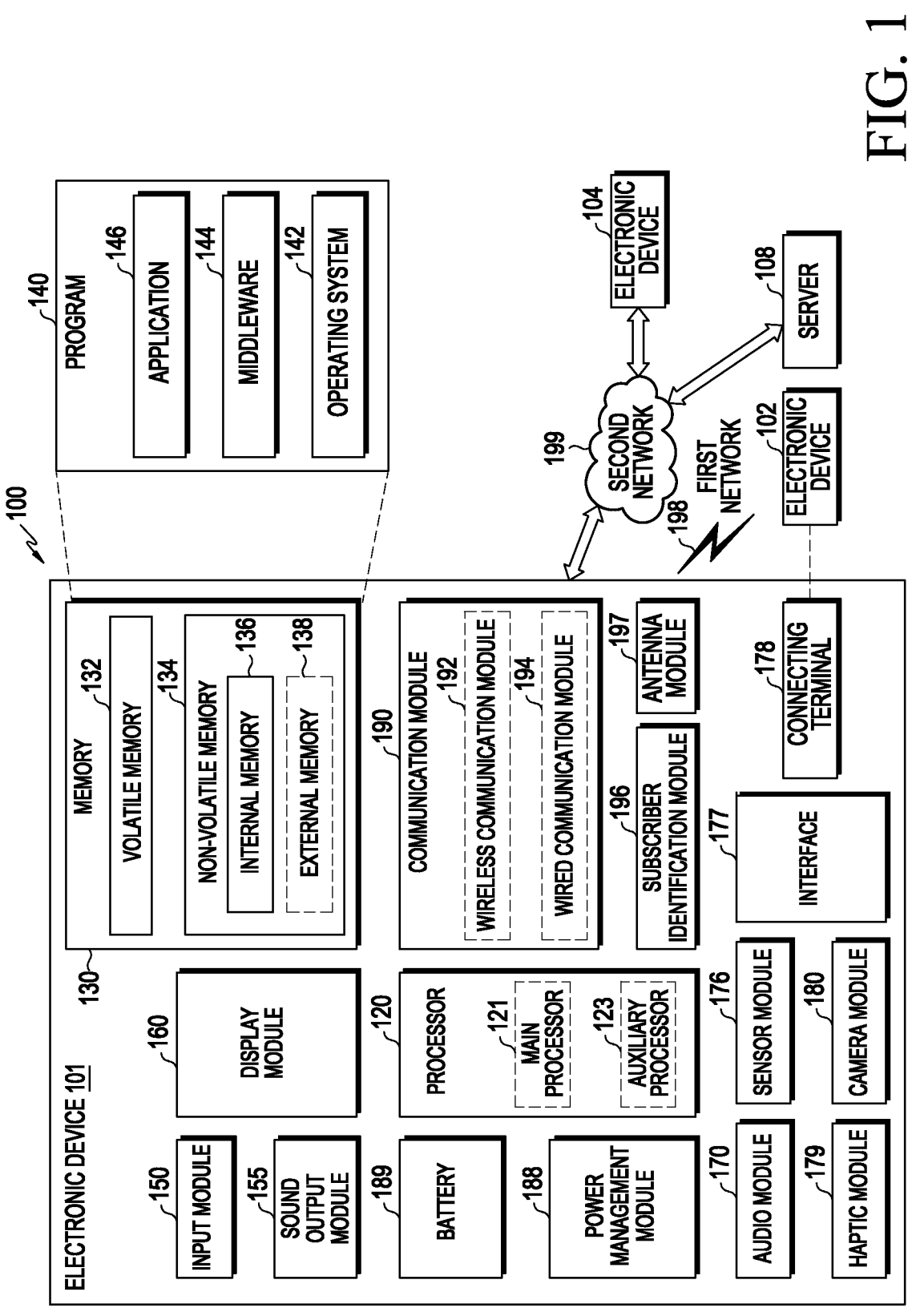
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
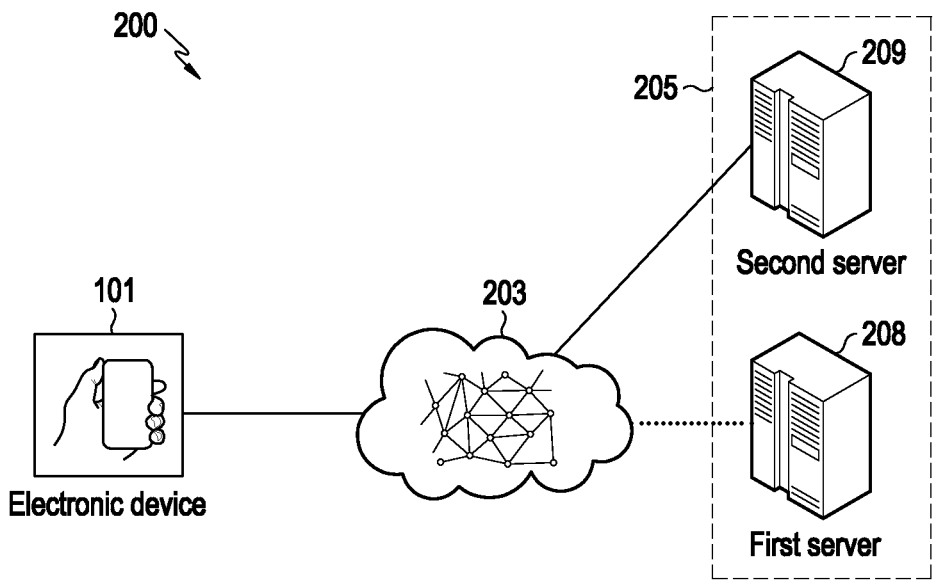
FIG. 2 is a diagram illustrating an example configuration of a system for providing content according to various embodiments.

FIG. 2 is a diagram illustrating an example configuration of a system for providing a content preview according to various embodiments.

Referring to FIG. 2, a system 200 for providing a content preview may include the electronic device 101 and at least one server 205 (e.g., a first server 208 and a second server 209). The electronic device 101 of FIG. 2 may include the same components as or similar components to those of the electronic device 101 of FIG. 1.

According to various embodiments, the electronic device 101 may provide content to a user. The content may include, for example, web content provided over the Internet and multimedia content provided over a broadcast network. According to an embodiment, the electronic device 101 may download or stream content from the at least one server 205 (e.g., a content provider) over a network 203. For example, the electronic device 101 may receive web content from the first server 208 and multimedia content from the second server 209. Further, for example, when the electronic device 101 supports IoT-based services, the at least one server 205 may include a server that provides the IoT-based services.

The network 203, which may include a data communication network, may be a private network or a public network. For example, the network 203 may include at least one of a personal area network covering a home, a local area network covering a building, a wide area network covering a metropolitan area, a region, or an area connected across national boundaries, or the Internet.

According to various embodiments, the at least one server 205 may be the server 108 described above with reference to FIG. 1. According to various embodiments, the at least one server 205 may communicate with the electronic device 101 on a user side through the network 203. The at least one server 205 may include a plurality of servers (e.g., the first server 208 and the second server 209), and each of the plurality of servers may provide different content in terms of category, type, or attribute.

According to various embodiments, the at least one server 205 is a server providing content that the user of the electronic device 101 wants to receive, and may require log-in in a content providing operation. Accordingly, the electronic device 101 may log in using a user name and a password. For example, log-in may refer to an operation of identifying a personal account using the electronic device 101 in the process of accessing a website or application operated by the at least one server 205.

According to an embodiment, the first server 208 and the second server 209 included in the at least one server 205 may provide movies and broadcast content, respectively. Alternatively, the at least one server 205 may include a single server that integrally provides various types of content.

According to an embodiment, the services provided by the at least one server 205 may include services in various fields, such as content services. For example, the content services may refer to, but not limited to, services that provide images, videos, or music included in multimedia content. According to an embodiment, each of the first server 208 and the second server 209 may correspond to at least one of a web content delivery server, a broadcast server, an over the top (OTT) server, a cloud server, or a streaming server.

According to an embodiment, the at least one server 205 may support a preview service that allows users to use desired content.

Figure 3:
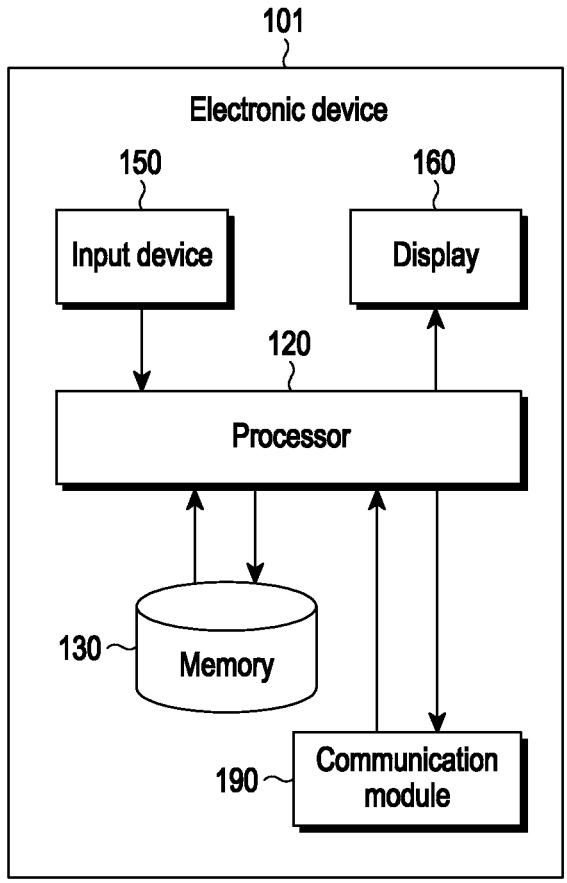
FIG. 3 is a block diagram illustrating an example configuration of an electronic device according to various embodiments.

FIG. 3 is a block diagram illustrating an example configuration of an electronic device according to various embodiments.

Referring to FIG. 3, the electronic device 101 according to various embodiments (e.g., the electronic device 101 of FIGS. 1 and 2) may include the communication module (e.g., including communication circuitry) 190 (e.g., the communication module 190 of FIG. 1) for communicating with a server (e.g., the server 108 of FIG. 1 and the at least one server 205 of FIG. 2), the processor (e.g., including processing circuitry) 120 (e.g., the processor 120 of FIG. 1) operatively connected to the communication module 190, and the memory 130 (e.g., the memory 130 of FIG. 1) operatively connected to the communication module 190 and the processor 120. The electronic device 101 may also include an input device (e.g., including input circuitry) 150 (e.g., the input module 150 of FIG. 1) and a display 160 (e.g., the display module 160 of FIG. 1). All of the components illustrated in FIG. 3 are not required for the electronic device 101, and the electronic device 101 may be implemented with more or fewer components than those illustrated in FIG. 3.

According to various embodiments, the memory 130 may store a control program for controlling the electronic device 101, a user interface (UI) related to an application provided by a manufacturer or downloaded from the outside, and images, user information, documents, databases, or related data for providing a UI.

According to an embodiment, the memory 130 may store user settings for at least one application related to a real-time content preview. For example, preview content may be at least a part of real-time content.

According to an embodiment, the memory 130 may store user settings related to reservation of and/or subscription to content on a per-application basis. For example, the user may reserve or subscribe to a preferred channel and/or broadcast program in a content-related application, and view content of the preferred channel in a preview without executing the application.

For example, real-time content may be content received from the at least one server 205 in a streaming fashion. For example, the real-time content may be content received from at least one of a web content delivery server, a broadcast server, an OTT server, a cloud server, or a streaming server. In addition, the real-time content may include various types of content such as, but not limited to, music streaming content, IoT real-time CCTV content, and so on.

According to various embodiments, the display 160 may detect a touch in addition to simultaneously supporting a data input/output function. According to an embodiment, the display 160 may include a sensing panel (not shown), a display panel (not shown), and a display controller (not shown). According to an embodiment, the display 160 may be referred to as a touch screen. The sensing panel may detect contact or proximity of a finger or the input device 150 (e.g., a stylus pen). For example, the sensing panel may detect a hovering input of the input device 150 and transmit an input signal corresponding to the hovering input to the processor 120. In addition, the sensing panel may detect the position of a touch input of a finger or the input device 150, and the display panel may output an image. The display controller may be a driving circuit that controls the display panel to output an image.

According to various embodiments, when implemented in the form of a touch screen, the display 160 may display various types of information generated in response to a user touch. The display 160 may be the display module 160 described before with reference to FIG. 1.

According to various embodiments, the input device 150 may include various input circuitry and generate an input signal for a content preview. The input device 150 may include a mechanical device such as a stylus pen. For example, the input device 150 may generate, in response to a user input, an input signal requesting activation of a preview for at least one of objects representing a plurality of applications displayed on the display 160 or an input signal for executing an application that provides a content preview.

According to various embodiments, the communication module 190 may include various communication circuitry and establish a communication channel with the at least one server 205 and support data transmission and reception for using content. For example, when accessing the server 205, the communication module 190 may receive data for a preview of content related to an application from the server 205.

According to various embodiments, an object representing each of applications may be displayed on the display 160. At least some of the objects may represent applications capable of providing content.

According to various embodiments, when a condition for providing a preview for at least one of the objects representing the applications capable of providing content is satisfied, the processor 120 may provide the user with a preview of real-time content. For example, the preview may include, for example, a real-time streamed video, a content schedule, and a description of content.

According to various embodiments, the processor 120 may include various processing circuitry and identify whether a preset input is received through the display 160 or the input device 150 to determine whether to activate a real-time content preview for at least one application. According to an embodiment, the activation of the content preview may be triggered by a predetermined input method, such as a touch pressure on an object representing an application, a touch duration (e.g., long press), a double finger pressure, or a hovering input. On the other hand, the content preview may be deactivated after a certain amount of time, upon release of the touch input or upon input of an additional touch.

According to various embodiments, the processor 120 may identify whether there is a preset input for at least one of the objects displayed on the display 160. In response to the preset input, the processor 120 may provide content provided by an application corresponding to the object in an area related to the object. For this purpose, the processor 120 may access the server 205 corresponding to the application and obtain data related to play of real-time content related to the application. For example, the data related to the real-time content play may be preview content as a part of the content. According to an embodiment, the area related to the object may be an area in which the object is disposed or the inside of the object. According to an embodiment, the area related to the object may be an area adjacent to the area in which the object is displayed, and the preview content may be displayed in the form of a quick option or a pop-up window in the adjacent area.

According to various embodiments, when obtaining the data related to play of the real-time content related to the application, the processor 120 may obtain the data related to play of the real-time content related to the application from the server 205 based on pre-stored user settings related to reservation and/or subscription. According to an embodiment, the processor 120 may obtain real-time content corresponding to the user settings from real-time content available from the server 205. When there are no pre-stored user settings, the processor 120 may obtain data related to play of real-time content provided by default by the server 205. For example, when the user has reserved or subscribed to a plurality of preferred channels, there may be a plurality of related contents, and thus the processor 120 may obtain the plurality of related contents for a preview. The processor 120 may sequentially provide previews of the plurality of related contents. For example, the processor 120 may sequentially play real-time preview contents on a per-preferred channel basis.

While it has been described above that a preview of real-time content is provided in response to a user input for an object representing an application related to content play, by way of example, the preview of the real-time content may also be provided without a user input. For example, the processor 120 may provide a content preview of an application in response to a notification event for the application. According to various embodiments, the processor 120 may identify an application for which an event has occurred among applications capable of providing content. For example, in the case of an application related to real-time CCTV content, upon occurrence of an event, the processor 120 may provide, for example, a preview of monitored video content in real-time in an area related to an object in response to the occurrence of the event.

According to various embodiments, the processor 120 may identify whether there is an additional user input for the object, while providing the preview in the area related to the object. For example, when the processor 120 receives an additional user input for executing the application corresponding to the object during execution of the preview of real-time content, the processor 120 may execute the application corresponding to the object and play content immediately following the preview through the application. The content preview in the area related to the object will be described later with reference to FIGS. 4 and 5.

According to various embodiments, the electronic device 101 may include the display 160, and the at least one processor 120 operatively connected to the display, and memory 130. The memory storing instructions configured to, when executed, cause to the electronic device to display objects representing a plurality of applications, respectively on the display, obtain data related to play of real-time content related to an application corresponding to a first object in response to a first input for the first object among the objects, and provide a preview of the real-time content in an area related to the first object, based on the obtained data.

According to various embodiments, the real-time content may be content received from a server (e.g., the at least one server 205 of FIG. 2) by streaming.

According to various embodiments, the preview of the real-time content may be played in an area in which the first object is located.

According to various embodiments, the preview of the real-time content may be played through a quick option or a pop-up window in an area adjacent to the first object.

According to various embodiments, the instructions are configured to cause the electronic device to store a user setting related to reservation of and subscription to content per application in the memory 130.

According to various embodiments, the instructions are configured to cause the electronic device to obtain the data related to the play of the real-time content related to the application corresponding to the first object based on the user setting.

According to various embodiments, the instructions are configured to cause the electronic device to, when there are a plurality of real-time contents related to the application corresponding to the first object, sequentially play the plurality of real-time contents in the area related to the first object.

According to various embodiments, the instructions are configured to cause the electronic device to execute the application corresponding to the first object in response to a second input for the first object during providing of the preview of the real-time content, and provide the real-time content through the application corresponding to the first object.

According to various embodiments, the instructions are configured to cause the electronic device to detect occurrence of an event related to an application corresponding to a second object among the objects, and provide a preview of monitored video content in an area related to the second object in response to the occurrence of the event. According to various embodiments, the instructions are configured to cause the electronic device to, in response to the first input for the first object, change the first object to a third object including the preview of the real-time content, and display the third object including the preview of the real-time content.

According to various embodiments, the first input may include at least one of a long press input or a hovering input.

Figures 4A, 4B:
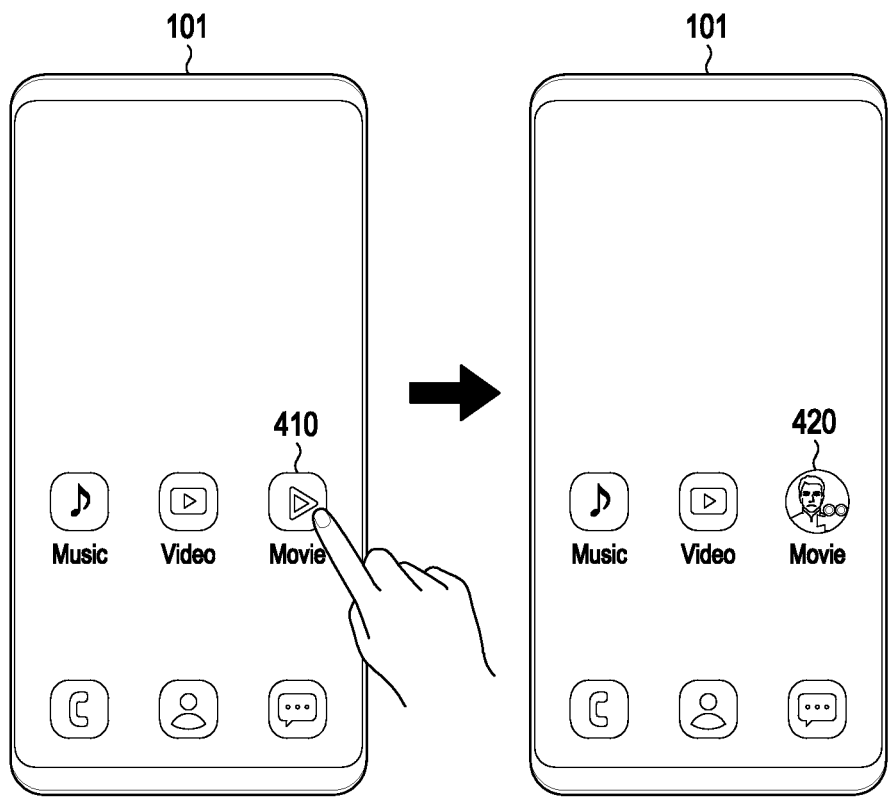
FIGS. 4A and 4B are diagrams illustrating an example method of providing a preview through an application icon according to various embodiments.

FIGS. 4A and 4B are diagrams illustrating an example method of providing a preview through an application icon according to various embodiments.

Referring to FIG. 4A, the electronic device 101 may be operating in an input waiting mode in which it awaits a user input. For example, the display 160 may display various screens in the input waiting mode under the control of the processor 120. For example, the electronic device 101 may display a home screen or a menu screen on the display 160.

Referring to FIG. 4A, the electronic device 101 may display a plurality of objects on the display 160. For example, various visual objects such as shortcut icons for executing available applications, widgets, icons representing documents in various file types, photos, and folders may be displayed in a matrix of rows and columns. The visual objects may be formed as icons or buttons including images, text, photos, or combinations thereof.

FIG. 4A illustrates an example in which the objects are formed as shortcut icons. According to an embodiment, an icon 410 may include a unique image and an application name. The unique image may be formed as an image such as a character or symbol or text such as a logo, which represents an application corresponding to the icon 410 or facilitates identification of the icon 410.

According to an embodiment, the icon 410 in FIG. 4A may be content last updated by the user or immediately previous content used by the electronic device 101 connected to the server 205.

According to an embodiment, unique images and application names for a plurality of objects displayed on the display 160 of the electronic device 101 may allow the user to recognize whether applications are capable of providing real-time content. Accordingly, a content preview may be provided to allow the user to recognize what content is currently available through a current application prior to execution of the application.

According to various embodiments, the objects may be changed on the display 160 in response to a user input or occurrence of an event, as illustrated in FIG. 4B. For example, the user input may include a touch (tap), a touch duration (e.g., long press), a touch input such as a double tap, or a voice command, and in addition, the content preview may be triggered by a predetermined input method such as a touch pressure or a designated specific key.

According to an embodiment, a content preview may be provided in an area related to an object in response to a user input. FIG. 4B illustrates an example in which a content preview is provided in an area where an object is disposed as an example of an area related to the object.

According to an embodiment, a content preview provided in an area 420 related to an object in response to a user input may include, for example, a real-time streamed video and a content name. The content name may include text identifying content. In addition, the content preview may include an image in the form of animated.gif, a content schedule, or a description of content, in addition to a short video of user-set content and a user-set channel.

According to an embodiment, the real-time content preview of the user-set preferred content or channel may be provided in various manners in the area 420 related to the object. According to an embodiment, when there is no user-preset information in relation to a preview, a preview provided by a content provider (e.g., the at least one server 205 of FIG. 2) may be output (or displayed).

For example, when previously viewed content is real-time streamed content, a preview of content currently being broadcast in real time may be provided in the object-related area 420. Additionally, when the previously viewed content is video-on-demand (VOD) content, a preview of immediately previous used content may be provided for continued viewing in the object-related area 420. Then, the real-time content preview may be changed to last content viewed or listened to by the user in the object-related area 420 after a lapse of a predetermined time. For example, an image related to the changed content may be displayed in the object-related area 420.

As described above, a unique image included in the object 410 in FIG. 4A may be replaced with preview content related to the application corresponding to the object in response to a user input, as illustrated in FIG. 4B. According to an embodiment, the preview content may be a part of real-time content, including a variety of contents, such as, but not limited to, a broadcast program provided in real-time, streamed media content, streamed music content, and IoT real-time CCTV content. Although FIGS. 4A and 4B illustrate an example of providing a content preview through a single object, for convenience of description, more content previews may be provided.

According to an embodiment, the activation of the real-time content preview may be triggered by a predetermined input method. For example, the predetermined input method may include at least one of a touch input, a touch duration, a voice command, or a hovering input. According to an embodiment, the activation of the preview may be triggered by a predetermined input method such as a touch pressure, a touch duration (e.g., long press), a double finger pressure, or a designated specific key, in addition to a touch input.

For example, when the user presses a finger on the surface of the display 160 for a certain amount of time, a touch duration may be identified from a touch input received through the display 160, and this may be considered to be an input requesting a content preview. For example, a threshold touch pressure and a threshold touch duration may be defined by the user or during manufacturing of the electronic device.

Figures 5A, 5B:
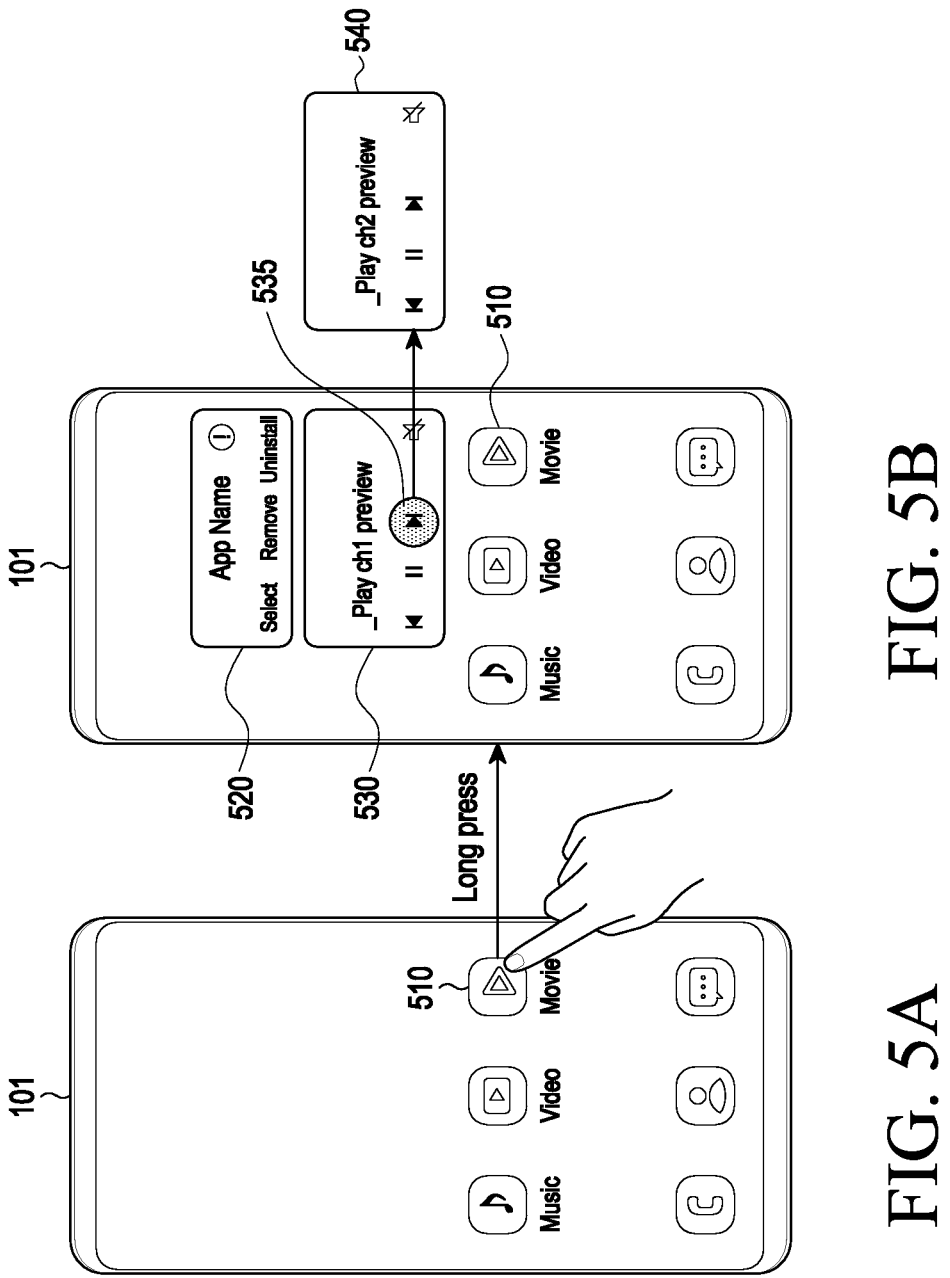
FIGS. 5A and 5B are diagrams illustrating an example method of providing a preview through a pop-up window according to various embodiments.

FIGS. 5A and 5B are diagrams illustrating an example method of providing a preview through a pop-up window according to various embodiments.

According to various embodiments, the electronic device 101 may provide a content preview in an area related to an object in response to a user input, and FIG. 5B illustrates an example case in which a content preview is provided, for example, in the form of a quick option or a pop-up window (or pop-up player) in an area adjacent to an object as an example of an area related to the object.

As illustrated in FIG. 5A, the electronic device 101 may provide a content preview as a quick option as illustrated in FIG. 5B, in response to selection of any one object 510 among a plurality of objects. For example, when the user taps and holds (e.g., long presses) any one 510 of the objects, a quick option may be provided at a position adjacent to the object 510. The quick option may include at least one of a preview or a control menu 530 for real-time content, in addition to a menu 520 related to editing of an application.

According to various embodiments, the content preview or the control menu 530 related to the application corresponding to the object 510 may be provided in the form of a pop-up player or mini-player, as illustrated in FIG. 5B. For example, the pop-up player may select jump to at least one channel that the user has registered as a preferred channel, and when the user has set a plurality of preferred channels, content corresponding to a next preferred channel may be played in the form of a preview 540 by pressing a next button 535. The control menu 530 for a preferred channel may include, but not limited to, items (e.g., fast forward (PP) and rewind (RW)) related to play, instead of the channel jump. In this way, the user may identify desired content in real time by changing channels in the pop-up player, without executing the corresponding application. When there are no pre-registered user settings related to the application corresponding to the object 510, a default preview of real-time content provided by the application may be provided. When receiving an additional input to execute the application corresponding to the object 510, the electronic device 101 may execute the application to play content of a default channel.

According to an embodiment, the pop-up player may provide a function of continued viewing or listening for content being previewed. For example, the user may play preview content by pressing a play button and stop outputting the played content by pressing a stop button. The user may also end the content preview by pressing a close button. In this way, the pop-up player may provide related content information together with a preview function for real-time content, without executing an application. In another example, the pop-up player may provide a function of playing content a certain amount of time forward from a point where the user left off, depending on the purpose of a content provider.

Figure 6:
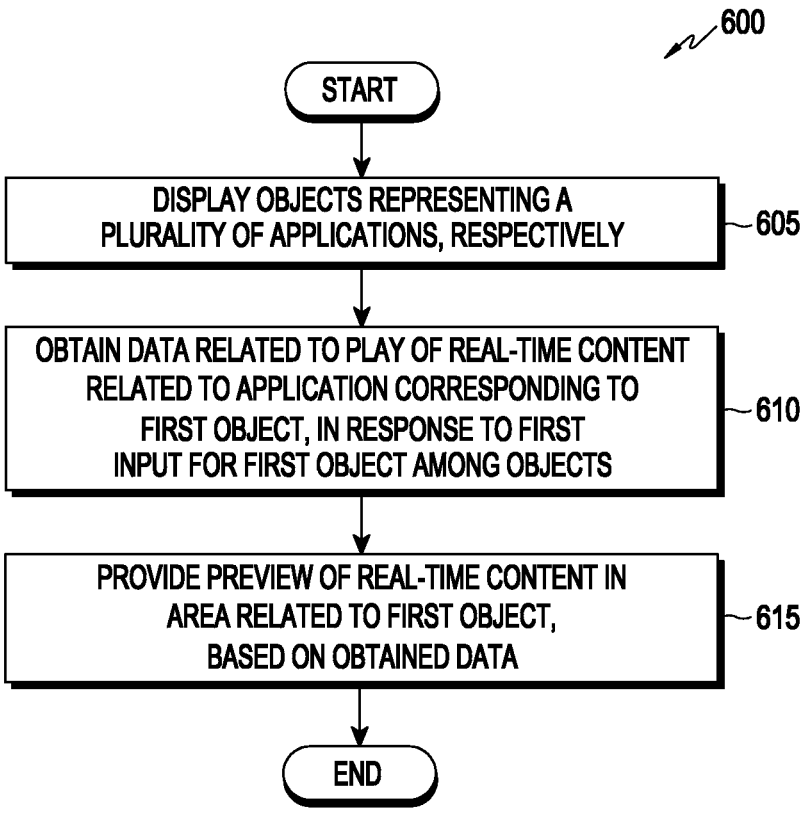
FIG. 6 is a flowchart illustrating an example operation of providing a content preview in an electronic device according to various embodiments.

FIG. 6 is a flowchart 600 illustrating an example method of providing a content preview in an electronic device according to various embodiments. The method may include operations 605 to 615. Each step/operation of the method may be performed by at least one electronic device (e.g., the electronic device 101 of FIGS. 1 and 2 or the at least one processor 120 of the electronic device 101 of FIG. 3). In an embodiment, at least one of the operations 605 to 615 may be omitted, the order of some of the operations may be changed, or other operations may be added. FIG. 6 will be described in greater detail below with reference to FIG. 7.

Referring to FIG. 6, in operation 605, the electronic device 101 may display objects representing a plurality of applications, respectively.

In operation 610, the electronic device 101 may obtain data related to play of real-time content related to an application corresponding to a first object in response to a first input for the first object among the objects. According to an embodiment, the electronic device 101 may obtain data related to play of real-time content from the server 205 related to the application in response to the first input.

For example, the real-time content may include various multimedia contents such as video-on-demand (VOD) as well as streamed video and audio content.

Figure 7:
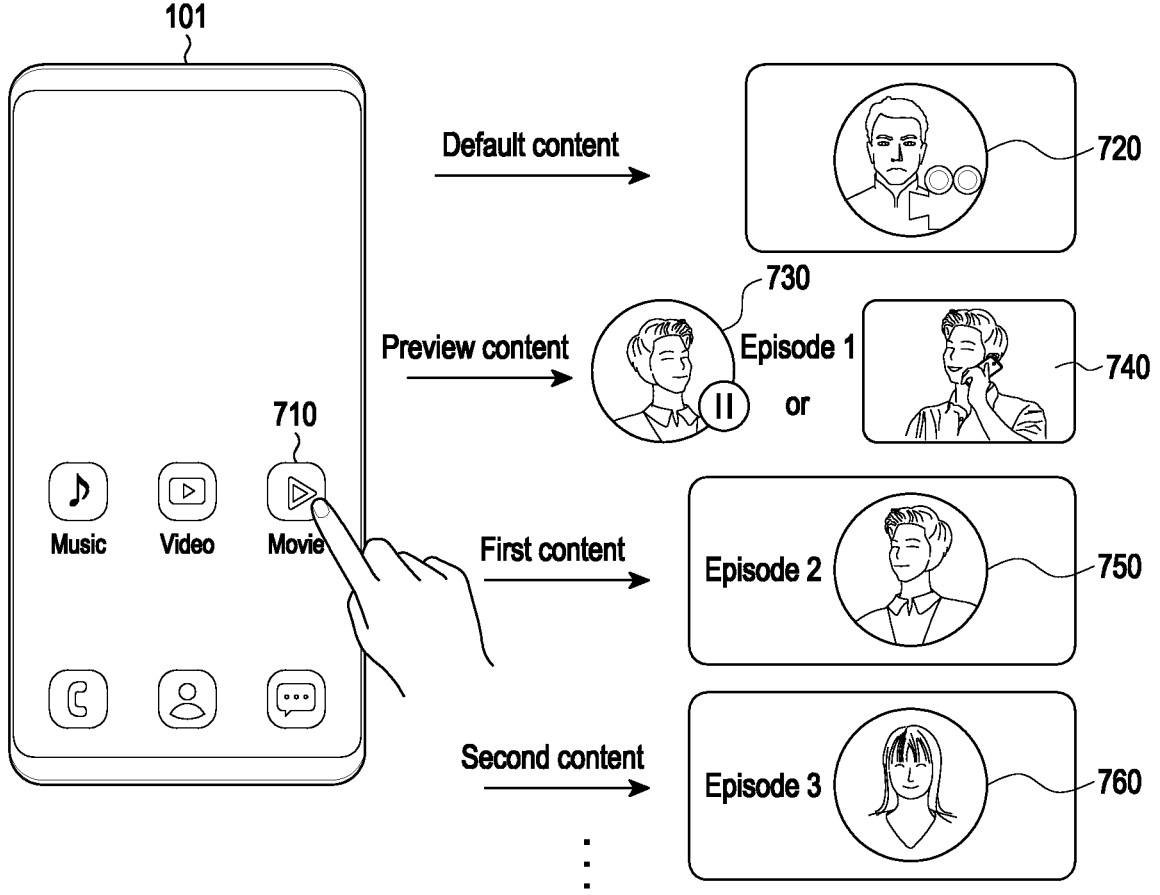
FIG. 7 is a diagram illustrating an example preview method for a plurality of contents according to various embodiments.

In operation 615, the electronic device 101 may provide a preview of the real-time content in an area related to the first object based on the obtained data. According to an embodiment, the preview of the real-time content may be configured to be disposed in a certain area. Reference may be made to FIG. 7 to further describe display methods related to a preview of real-time content.

FIG. 7 is a diagram illustrating an example preview method for a plurality of contents according to various embodiments.

Referring to FIG. 7, the electronic device 101 may provide default content 720 provided by an application corresponding to a first object 710 in an area where the object is located. For example, in the absence of user-preset information for the application, the electronic device 101 may obtain data related to play of real-time content currently provided by the server 205 and provide a preview of the default content 720 based on the data.

When user settings for the application corresponding to the first object 710 are stored, the electronic device 101 may provide preview contents 730 and 740 in a pop-up window in a certain area, for example, an area where the object is located or an area adjacent to the area where the object is located, by reflecting the user settings. In another example, when receiving a preset input during play of the preview content 730 in the area where the object is located, the electronic device 101 may provide the preview content 740 in a pop-up window (or pop-up player). For example, the pop-up player may provide related content information together with a preview of real-time content, without executing an application, and serve to provide a preview in an enlarged size, compared to the preview in the area where the object is located. The pop-up player may also be enlarged to a full screen.

As illustrated in FIG. 7, the preview content 730 provided in the area where the object is located may include real-time content and a preview control function. For example, a button related to play or stop of the preview function may be included at a position adjacent to the preview content 730. Text representing a title or description of the preview content 730 may further be displayed at the adjacent position. For example, text indicating a current episode number of the preview content 730 may be displayed. In this case, when the previous episode has been viewed and the next episode is available, information about the new episode may be displayed. For example, in the presence of an additional user input during play of the preview, the electronic device 101 may further display episode information and recommended content related to the content.

According to an embodiment, user setting-based content and content of channel information may be played in the area where the object is located in FIG. 7, in response to a predetermined user input. For example, when a viewing or listening history of the user is changed, user setting-based content corresponding to the changed history and information related to the content may be updated together. For example, when the last content used by the user is real-time streaming content, content that is currently being broadcast in real time may be displayed, and when the content is VOD content, information for continued viewing may also be displayed.

According to an embodiment, when user settings are stored, the electronic device 101 may obtain content distinguished on a channel basis according to the user settings such as preferred channels or reserved channels. According to an embodiment, data related to play of real-time content may be preview content as a part of the content rather than the entire content.

According to an embodiment, there may be a plurality of real-time contents corresponding to the user settings. In the case of the plurality of contents, the electronic device 101 may provide a preview of first real-time content 750 and then a preview of second real-time content 760. In this manner, previews of real-time contents may be provided sequentially at specific time intervals. According to an embodiment, when preview content is played sequentially, a description of the preview content may be disposed at an adjacent position. Accordingly, the user may identify information about episodes of the sequentially played content.

According to various embodiments, a method of providing a content preview in an electronic device may include displaying objects representing a plurality of applications, respectively, obtaining data related to play of real-time content related to an application corresponding to a first object in response to a first input for the first object among the objects, and providing a preview of the real-time content in an area related to the first object, based on the obtained data.

According to various embodiments, the first input may be at least one of a long press input or a hovering input.

According to various embodiments, the method may further include storing a user setting related to reservation of and subscription to content per application in memory.

According to various embodiments, obtaining the data related to the play of the real-time content related to the application corresponding to the first object may include obtaining the data related to the play of the real-time content related to the application corresponding to the first object, based on the user setting.

According to various embodiments, the method may further include, when there are a plurality of real-time contents related to the application corresponding to the first object, sequentially playing the real-time contents in an area related to the first object.

According to various embodiments, the real-time content is content received from a server by streaming.

According to various embodiments, the preview of the real-time content may be played in an area in which the first object is located.

According to various embodiments, the preview of the real-time content may be played through a quick option or a pop-up window in an area adjacent to the first object.

According to various embodiments, the method may further include executing the application corresponding to the first object, in response to a second input for the first object during providing of the preview of the real-time content, and providing the real-time content through the application corresponding to the first object.

According to various embodiments, the method may further include detecting occurrence of an event related to an application corresponding to a second object among the objects, and providing a preview of monitored video content in an area related to the second object in response to the occurrence of the event.

Figure 8:
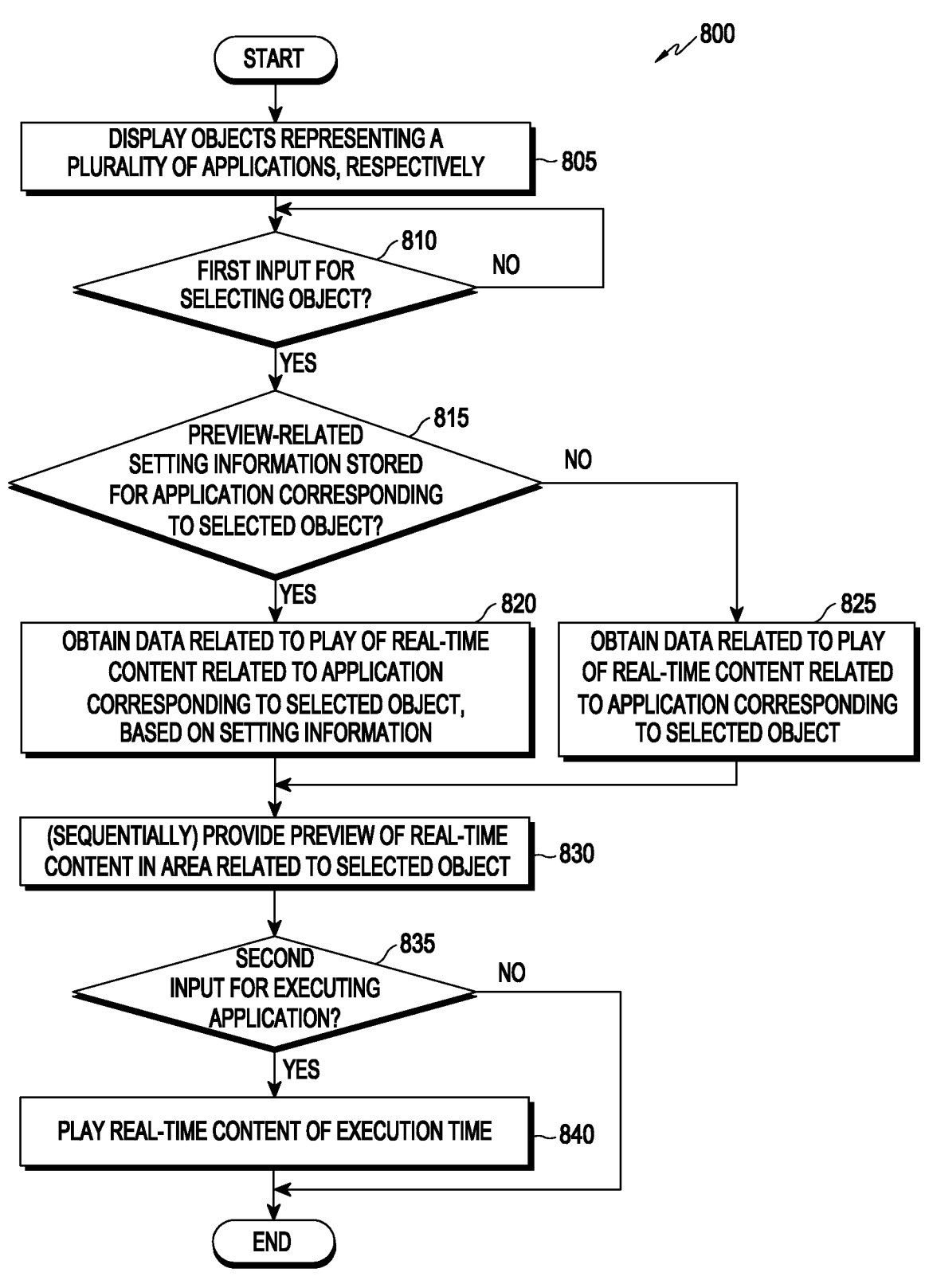
FIG. 8 is a flowchart illustrating an example operation of providing a content preview in an electronic device according to various embodiments.

FIG. 8 is a flowchart 800 illustrating an example method of providing a content preview in an electronic device according to various embodiments. The method may include operations 805 to 840. The operations illustrated in FIG. 8 may be performed in various orders, not limited to the illustrated order. In addition, according to various embodiments, more operations than those illustrated in FIG. 8 or at least one operation fewer than those illustrated in FIG. 8 may be performed. FIG. 8 will be described in greater detail below with reference to FIGS. 9A, 9B, 10A, 10B and 11.

In operation 805, the electronic device 101 may display objects representing a plurality of applications, respectively.

In operation 810, the electronic device 101 may identify whether there is a first input for selecting an object. The first input may be a preset input for activating a preview of content related to an application corresponding to the object. When the first input corresponds to an input for activating a content preview, the electronic device 101 may perform operation 815.

In operation 815, the electronic device 101 may identify whether preview-related setting information is stored for the application corresponding to the selected object. According to an embodiment, the electronic device 101 may have pre-registered user setting information related to reservation of and/or subscription to content available on each of applications. For example, the user may have set up reservation of and/or subscription to preferred channels and/or preferred content.

When preview-related setting information is stored for the application corresponding to the selected object, the electronic device 101 may obtain data related to play of real-time content related to the application corresponding to the selected object based on the setting information in operation 820. For example, the electronic device 101 may obtain data related to real-time content play for the preferred channels and/or the preferred content based on the setting information.

When no preview-related setting information is stored for the application corresponding to the selected object, the electronic device 101 may obtain data related to play of real-time content related to the application corresponding to the selected object in operation 825. For example, when no user settings are pre-stored, the electronic device 101 may obtain default data related to real-time content play, provided by the server 205.

In operation 830, the electronic device 101 may provide a preview of real-time content in an area related to the selected object. In this case, when there are a plurality of real-time contents obtained based on the setting information, the electronic device 101 may provide previews of the plurality of contents sequentially.

In operation 835, the electronic device 101 may identify whether there is a second input for executing the application. According to an embodiment, when receiving the second input during play of a preview of real-time content, the electronic device 101 may execute the application.

In operation 840, the electronic device 101 may play the real-time content of the execution time through the executed application in response to the execution of the application. For example, the electronic device 101 may play real-time content immediately following the preview content at the time of the execution of the application.

Figures 9A, 9B:
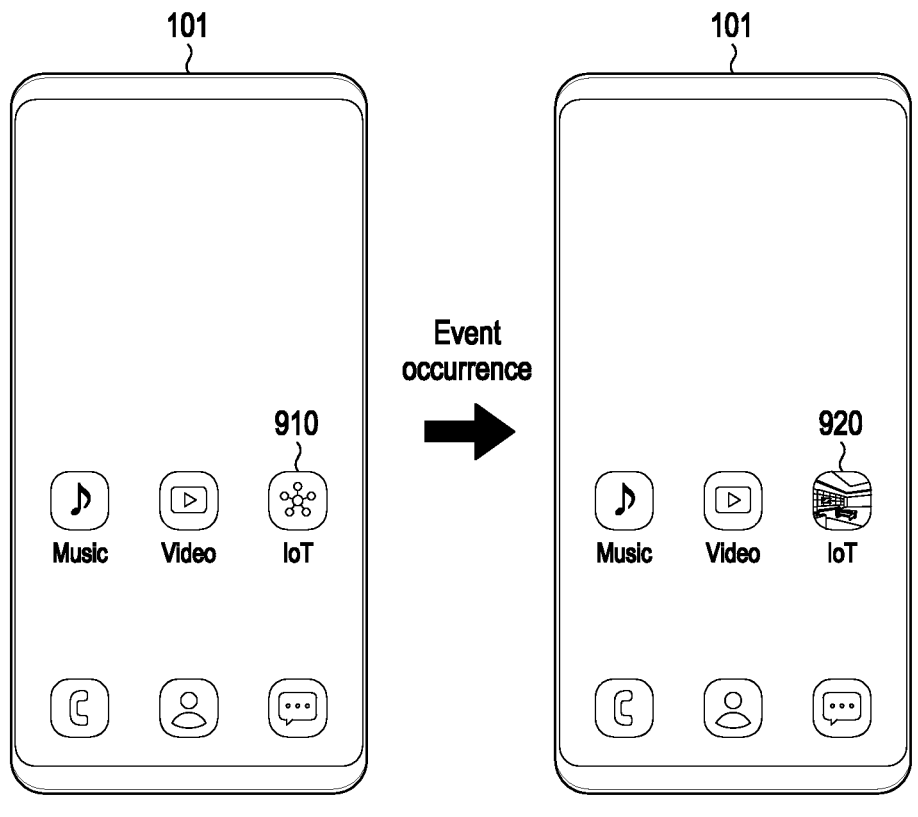
FIGS. 9A and 9B are diagrams illustrating an example first screen for a real-time content preview based on occurrence of an event according to various embodiments.

FIGS. 9A and 9B are diagrams illustrating an example first screen for a real-time content preview based on occurrence of an event according to various embodiments. FIGS. 9A and 9B illustrate a case in which a preview of real-time content is provided without a user input.

FIG. 9A illustrates a case in which an object 910 representing an IoT application is displayed on the display 160 of the electronic device 101. For example, the IoT application may be an application capable of providing IoT real-time CCTV content.

As illustrated in FIG. 9(*a*), the object may include an image representing the IoT-related application. Alternatively, the object may be formed using at least one of an icon or button including an image, text, a photo, or a combination thereof.

According to an embodiment, the electronic device 101 may detect occurrence of an event related to the application and, in response to the event occurrence, provide a preview of monitored video content in an area 920 related to the object, as illustrated in FIG. 9B. For example, upon occurrence of an event related to the application, the electronic device 101 may provide a notification of the event occurrence using the object. For example, in the case of the IoT-related application, the electronic device 101 may provide a preview of monitored video content in real time in the area 920 related to the object in response to the occurrence of the event, for example, as illustrated in FIG. 9B. In this manner, the notification of occurrence of the event in the form of a preview may increase user interest in the application.

According to an embodiment, when receiving an execution request for the object 910, the electronic device 101 may display a home screen of the IoT-related application. However, when receiving a user input for monitored video content provided in the area related to the object, the electronic device 101 may immediately display a monitoring screen.

Figures 10A, 10B:
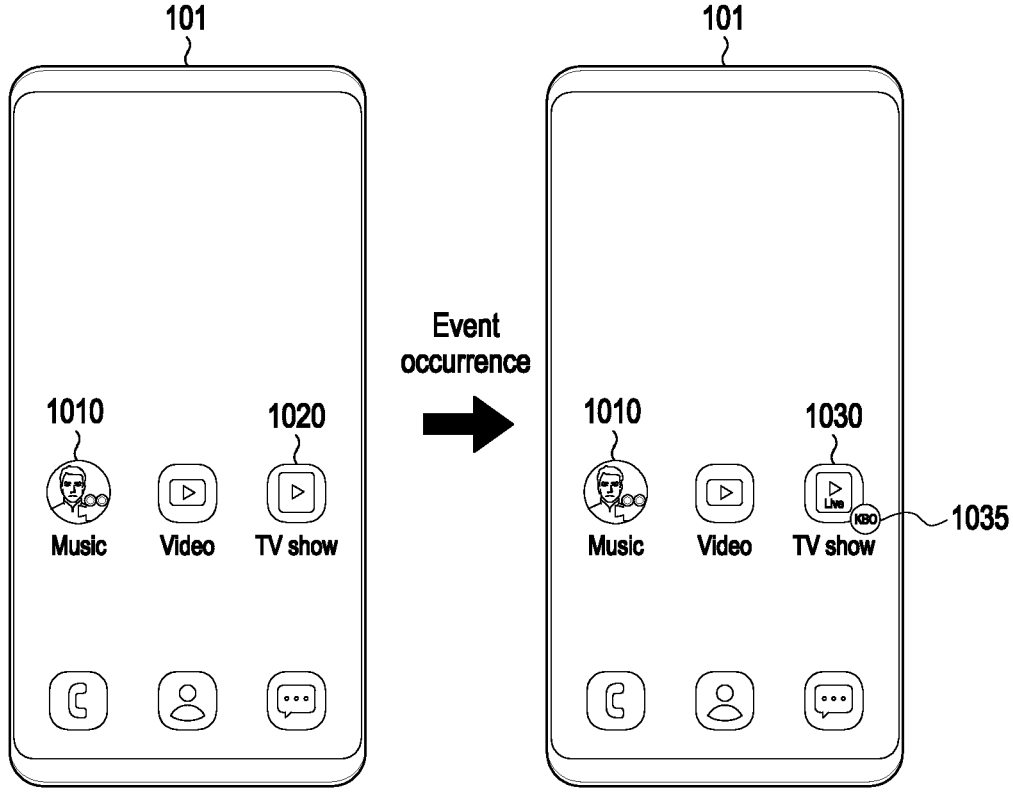
FIGS. 10A and 10B are diagrams illustrating an example second screen for a real-time content preview based on occurrence of an event according to various embodiments.

FIGS. 10A and 10B are diagrams illustrating an example second screen for a real-time content preview based on occurrence of an event according to various embodiments. FIGS. and 10B illustrate media content as an example of real-time content that may be provided in response to occurrence of an event, in addition to IoT real-time CCTV content.

FIG. 10A illustrates a case in which objects 1010 and 1020 representing media-related applications are displayed on the display 160 of the electronic device 101. As illustrated in FIG. 10A, prior to occurrence of an event, the first object 1010 may be the last content updated by the user or the immediately previous content used by the electronic device 101 connected to the server 205, and the second object 1020 may include an image representing a media-related application.

According to an embodiment, the electronic device 101 may identify whether an event has occurred in the applications corresponding to the first object 1010 and the second object 1020. When detecting occurrence of an event related to the application corresponding to the second object 1020, the electronic device 101 may provide a preview of real-time content in an area 1030 related to the object in response to the event occurrence, as illustrated in FIG. 10B. Further, it may be notified that a preview is available by, for example, changing the shape of an icon corresponding to the area 1030 related to the object or displaying an event occurrence notification 1035. For example, a preview of real-time content may be real-time broadcast content from a sub-scribed channel, with an indication that the content is live. Therefore, when receiving a user input to the area 1030 where the preview of the real-time content is provided, the electronic device 101 may execute the corresponding application and immediately display a real-time broadcast screen of the subscribed channel.

While real-time CCTV content and media content have been described above as examples, previews of various other contents may be provided, such as music streaming content.

Figure 11:
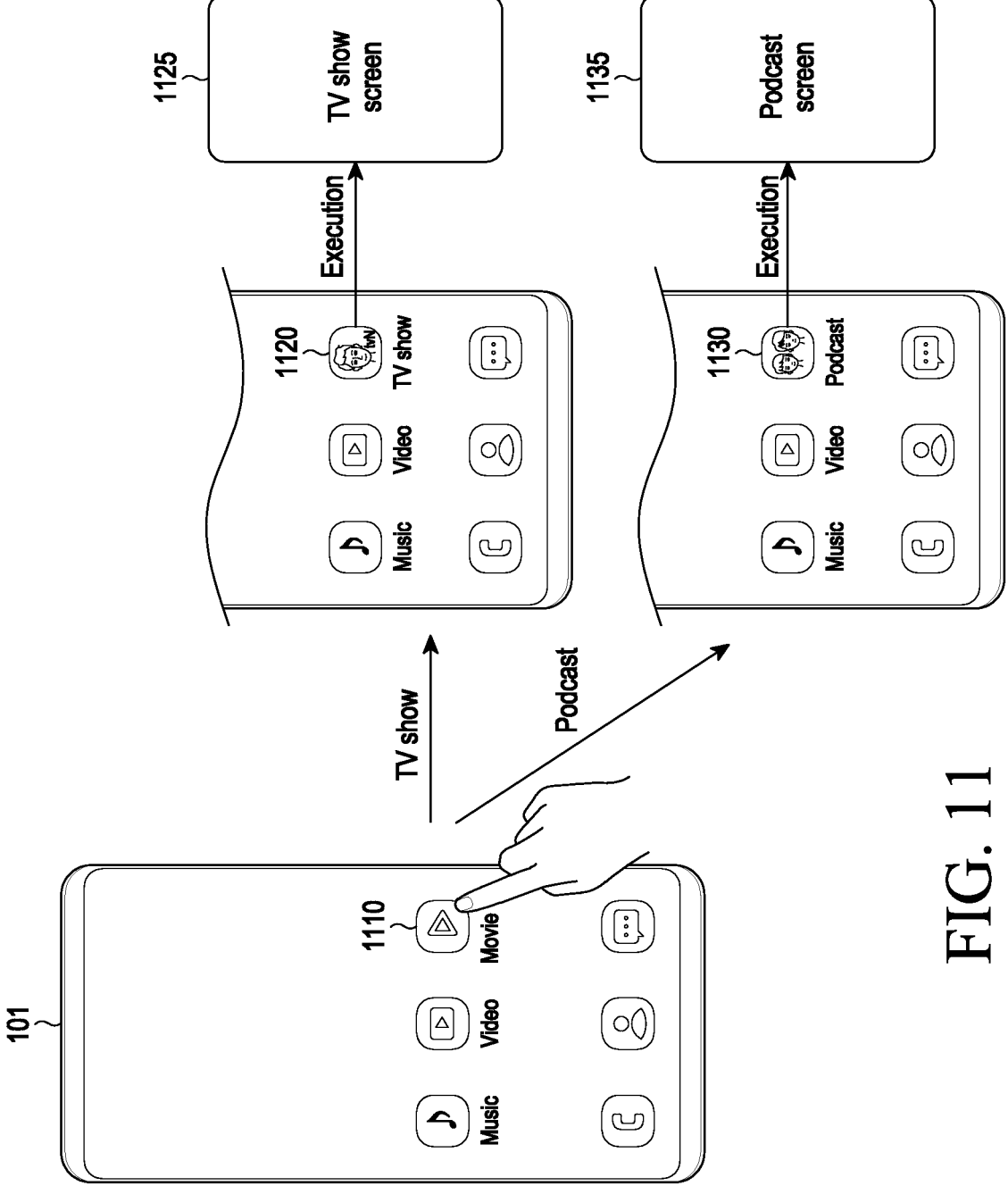
FIG. 11 is a diagram illustrating an example third screen for a real-time content preview based on reservation and subscription according to various embodiments.

FIG. 11 is a diagram illustrating an example third screen for a real-time content preview based on reservation and subscription according to various embodiments. FIG. 11 illustrates a case in which an object 1110 representing a media-related application is displayed on the display 160 of the electronic device 101.

Referring to FIG. 11, when receiving a preset input for an object 1110, the electronic device 101 may provide a content preview 1120 or 1130 corresponding to a broadcast program (e.g., TV show) or podcast based on user settings. For example, when content information reserved by the user according to the user settings is a broadcast program, the real-time content preview 1120 for the broadcast program may be provided. When the content information reserved by the user according to the user settings is a podcast, the real-time content preview 1130 for listening to the broadcast may be provided. Therefore, when receiving a user input for the real-time content preview 1120 for the broadcast pro-gram, the electronic device 101 may display a screen 1125 corresponding to the broadcast program by executing the corresponding application. Further, when receiving a user input for the real-time content preview 1130 for listening to a broadcast, the electronic device 101 may display a podcast screen 1135 for listening to the broadcast by executing the corresponding application.

Figures 12A, 12B, 12C:
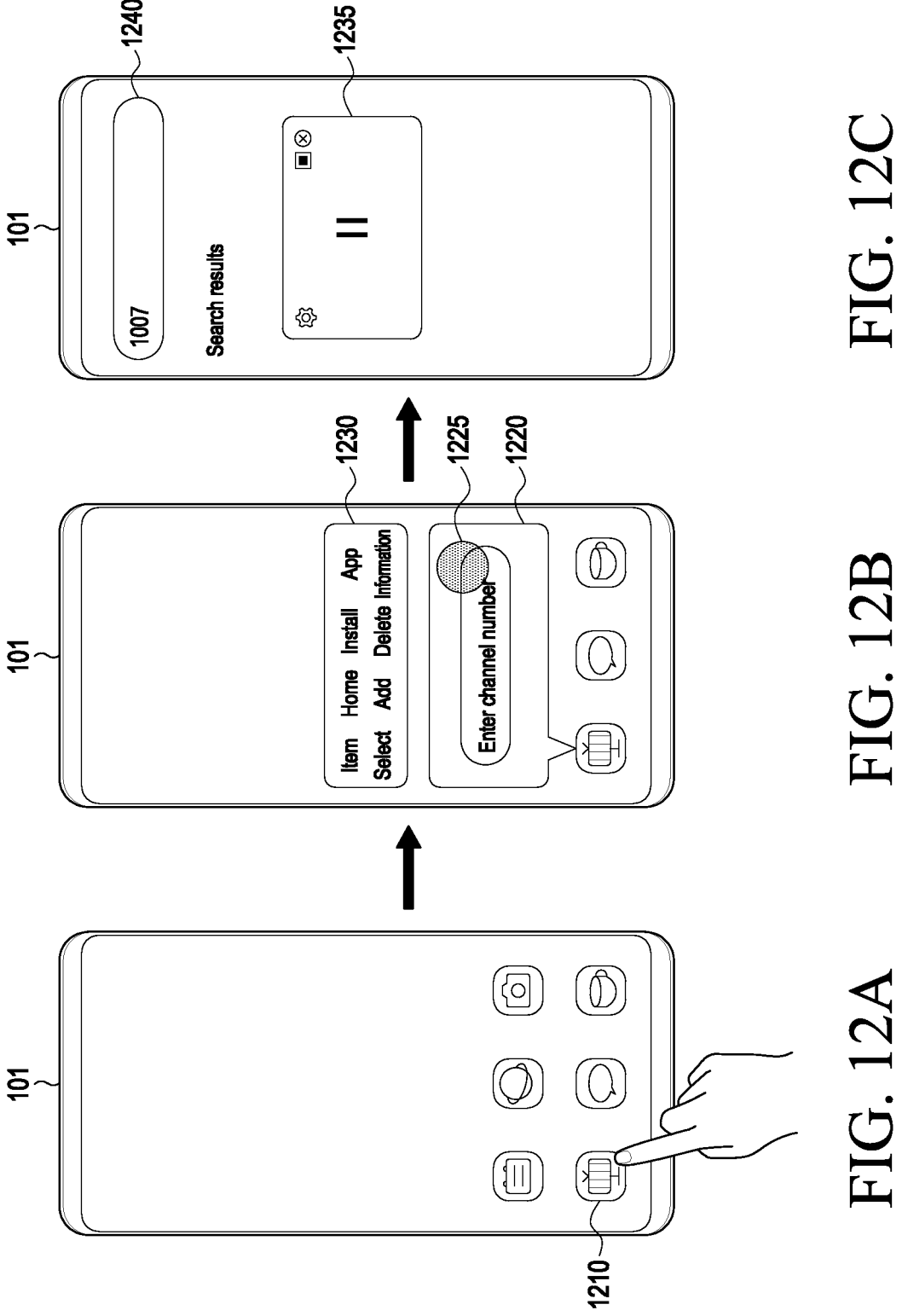
FIGS. 12A, 12B and 12C are diagrams illustrating an example method of providing a content preview for a channel selected from among a plurality of channels through a pop-up window according to various embodiments.

FIGS. 12A, 12B and 12C are diagrams illustrating an example method of providing a content preview through a pop-up window by channel search according to various embodiments.

Referring to FIG. 12A, the electronic device 101 may receive a user selection for any one object 1210 among a plurality of objects displayed on the display 160. The user-selected object 1210 may represent an application related to content play. For example, the application related to content play may be related to at least one of a web content delivery server, a broadcast server, an OTT server, a cloud server, or a streaming server.

According to an embodiment, when receiving a user selection for the object 1310, the electronic device 101 may identify whether the user input corresponds to a preset input for activation of a real-time content preview. According to an embodiment, the activation of the content preview may be triggered by a predetermined input method such as a touch pressure on the object representing the application, a touch duration (e.g., long press), a double finger pressure, or a hovering input.

Accordingly, when the user input corresponds to a preset input, the electronic device 101 may display a context menu in association with the object 1210, as illustrated in FIG. 12B. For example, the context menu may provide a menu for the application corresponding to the particular object, which may be activated when the object is long pressed.

As illustrated in FIG. 12B, the context menu may include a channel search window 1220 for searching for content available through the application and menu items 1230 for the application. For example, the user may enter a desired channel (e.g., a channel number or a channel name) in the channel search window 1220 as indicated by reference numeral 1225, and the electronic device 101 may provide a preview of content provided by the entered channel 1240 in a pop-up window 1235, as illustrated in FIG. 12C.

According to an embodiment, the pop-up window 1235 may include buttons related to play and stop of the content preview, which may be referred to as a pop-up player or media player. For example, the user may play preview content by pressing the play button and stop outputting the played content by pressing the stop button. The user may also exit the content preview by pressing a close button. In this manner, the pop-up player may provide related content information together with a real-time content preview func-tion, without executing the application.

Figures 13A, 13B, 13C:
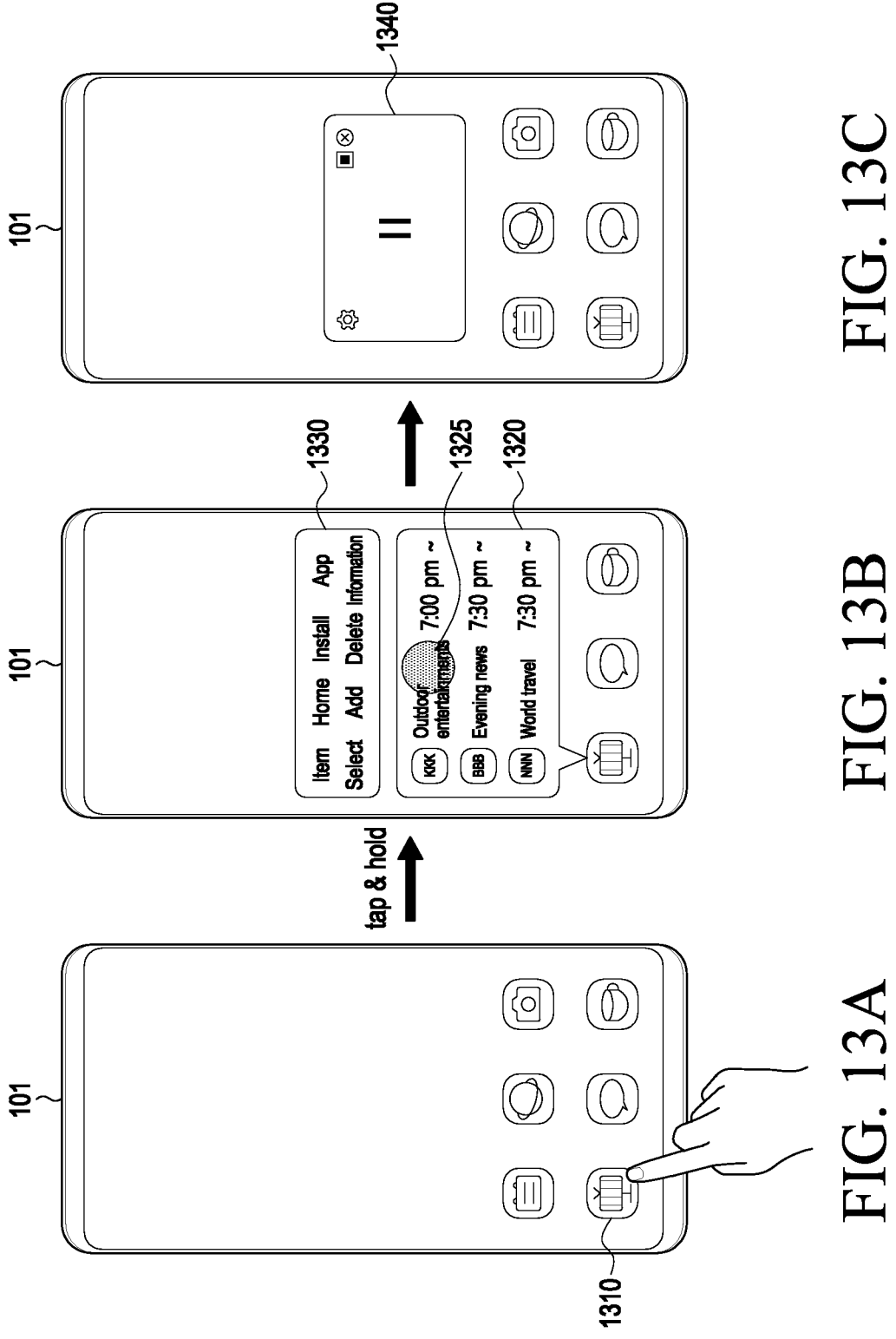
FIGS. 13A, 13B and 13C are diagrams illustrating an example method of providing a content preview through a pop-up window by channel search according to various embodiments.

FIGS. 13A, 13B and 13C are diagrams illustrating an example method of providing a content preview for a channel selected from among a plurality of channels through a pop-up window according to various embodiments.

Referring to FIG. 13A, the electronic device 101 may receive a user selection for an object 1310 of a plurality of objects displayed on the display 160. When the user selec-tion corresponds to a preset input, a context menu may be displayed in association with the object 1310 rather than an application corresponding to the object is executed, as illustrated in FIG. 13(b).

As illustrated in FIG. 13B, the context menu may include a channel program guide 1320 available through the appli-cation and menu items 1330 for the application. For example, the user may select a desired channel (e.g., a channel number or a channel name) from the channel program guide 1320, as indicated by reference numeral 1325, and as illustrated in FIG. 13C, the electronic device 101 may provide a preview of content provided by the selected channel through a pop-up window 1340. In this manner, the user may identify content provided through the channel without executing the application.

According to various embodiments, the electronic device 101 may provide a preview of content to be played or play the content in a pop-up window, prior to executing the application. When the application is executed, content immediately following the preview content may be played, thereby attracting much user interest to the content-related application, while increasing the likelihood of user selection.

FIGS. 14A and 14B are diagrams illustrating an example method of providing a content preview through a pop-up window in response to a hovering input according to various embodiments.

Referring to FIG. 14A, the electronic device 101 may detect a hovering input of the input device 150 (e.g., a stylus pen). When the input device 150 approaches within a certain distance from the display 160, the electronic device 101 may identify a hovering position, despite no direct contact with the input device 150. For example, when the user hovers the input device 150 over one of objects as illustrated in FIG. 14A, the electronic device 101 may execute a preview of real-time content through the pop-up window 1420 imme-diately after a period of time (e.g., N seconds), as illustrated in FIG. 14B.

As described above, the electronic device 101 may iden-tify an object corresponding to a hovering position among a plurality of objects displayed on a screen, and provide a preview of content related to an application corresponding to the object. For example, the electronic device 101 may provide a preview of content to be played in real time, corresponding to a recently used channel through a pop-up window, thereby attracting interest to the content, without actually executing the application. For example, the pop-up window may be for providing a preview of real-time content without executing the application, and the pop-up window may display a content play screen.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-transitory computer-readable storage medium may store instructions configured to, when executed by at least one processor of an electronic device, cause the electronic device to perform at least one operation. The at least one operation may include displaying objects representing a plurality of applications, respectively, obtaining data related to play of real-time content related to an application corresponding to a first object in response to a first input for the first object among the objects, and providing a preview of the real-time content in an area related to the first object, based on the obtained data.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display;

at least one processor, comprising processor circuitry, operatively connected to the display; and memory storing instructions configured to, when executed by the at least one processor, individually and/or collectively, cause the electronic device to:

control the display to display objects representing a plurality of applications, respectively, obtain data related to playing of a plurality of real-time contents related to an application corresponding to a first object in response to a first input for the first object among the objects, and replace an image included in the first object with preview content related to the real-time contents within an area of the first object, based on the obtained data, by sequentially playing the plurality of real-time contents in the area related to the first object.

2. The electronic device of claim 1, wherein the electronic device is configured to receive the real-time contents from a server by streaming.

3. The electronic device of claim 1, wherein the instructions are configured to cause the electronic device to store a user setting related to reservation of and subscription to content per application in the memory.

4. The electronic device of claim 1, wherein the instructions are configured to cause the electronic device to:

execute the application corresponding to the first object in response to a second input for the first object during providing of the preview of the real-time contents, and provide the real-time contents through the application corresponding to the first object.

5. The electronic device of claim 1, wherein the instructions are configured to cause the electronic device to:

detect occurrence of a notification event related to an application corresponding to a second object among the objects, and provide a preview of contents within an area related to the second object in response to the occurrence of the notification event.

6. The electronic device of claim 1, wherein the first input includes at least one of a long press input or a hovering input.

7. The electronic device of claim 1, wherein the instructions are configured to cause the electronic device to:

in response to the first input for the first object, change the first object to a third object including the preview of the real-time contents, and display the third object including the preview of the real-time contents.

8. The electronic device of claim 1, wherein the at least one operation further includes playing the preview of the real-time contents within the area of the first object, based on the obtained data.

9. A method of providing a content preview in an electronic device, the method comprising:

displaying objects representing a plurality of applications, respectively;

obtaining data related to playing of a plurality of real-time contents related to an application corresponding to a first object in response to a first input for the first object among the objects; and replacing an image included in the first object with preview content related to the real-time contents within an area of the first object, based on the obtained data by sequentially playing the plurality of real-time contents in the area related to the first object.

10. The method of claim 9, wherein obtaining the data related to the play of the real-time contents related to the application corresponding to the first object comprises obtaining the data related to the play of the real-time contents related to the application corresponding to the first object, based on a user setting related to reservation of and subscription to content per application.

11. The method of claim 9, further comprising:

executing the application corresponding to the first object in response to a second input for the first object during providing of the preview of the real-time contents, and providing the real-time contents through the application corresponding to the first object.

12. The method of claim 9, further comprising:

detecting occurrence of an event related to an application corresponding to a second object among the objects, and providing a preview of monitored video content in an area related to the second object in response to the occurrence of the event.

13. The method of claim 9, further comprising playing the preview of the real-time contents within the area of the first object, based on the obtained data.

14. A non-transitory computer-readable storage medium storing instructions which, when executed by at least one processor comprising processor circuitry, individually and/or collectively, cause an electronic device to perform at least one operation, wherein the at least one operation includes:

displaying objects representing a plurality of applications, respectively;

obtaining data related to playing of a plurality of real-time contents related to an application corresponding to a first object in response to a first input for the first object among the objects; and replacing an image included in the first object with preview content related to the real-time contents within an area of the first object, based on the obtained data by sequentially playing the plurality of real-time contents in the area related to the first object.

15. The non-transitory computer-readable storage medium of claim 14 wherein the at least one operation further includes playing the preview of the real-time contents within the area of the first object, based on the obtained data.

* * * * *